United States Patent
Miroshnichenko et al.

(10) Patent No.: US 12,065,878 B2
(45) Date of Patent: *Aug. 20, 2024

(54) SUPPORT CONNECTOR CONTROL

(71) Applicant: MECHOSHADE SYSTEMS, LLC, Middleton, WI (US)

(72) Inventors: Eugene Miroshnichenko, Oceanside, NY (US); Stephen Hebeisen, Amawalk, NY (US); Xi Ming Liarno, Bergenfield, NJ (US)

(73) Assignee: MECHOSHADE SYSTEMS, LLC, Middleton, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/497,238

(22) Filed: Oct. 30, 2023

(65) Prior Publication Data
US 2024/0076937 A1 Mar. 7, 2024

Related U.S. Application Data

(63) Continuation of application No. 18/101,243, filed on Jan. 25, 2023, now Pat. No. 11,840,887, which is a
(Continued)

(51) Int. Cl.
*E06B 9/80* (2006.01)
*E06B 9/42* (2006.01)
(Continued)

(52) U.S. Cl.
CPC .......... *E06B 9/80* (2013.01); *E06B 9/42* (2013.01); *E06B 9/78* (2013.01); *E06B 2009/804* (2013.01); *F16H 1/28* (2013.01)

(58) Field of Classification Search
CPC ..... E06B 9/80; E06B 9/42; E06B 9/78; E06B 2009/804
See application file for complete search history.

(56) References Cited

U.S. PATENT DOCUMENTS 644,758 A 3/1900 Beck
2,519,638 A 8/1950 Di Marzo
(Continued)

FOREIGN PATENT DOCUMENTS

KR 101357736 B1 2/2014
KR 101357737 B1 2/2014

OTHER PUBLICATIONS

USPTO; Non-Final Office Action dated Mar. 6, 2024 in U.S. Appl. No. 17/577,841.
(Continued)

*Primary Examiner* — Beth A Stephan
(74) *Attorney, Agent, or Firm* — SNELL & WILMER L.L.P.

(57) ABSTRACT

The support connector system includes a first shade band having a support connector and a lock that receives the support connector. The lock includes a first opening in a first position, wherein the first opening is configured to receive the support connector and configured to restrict rotation of the support connector. The lock includes a second opening in a second position, wherein the second opening is configured to receive the support connector and configured to allow rotation of the support connector.

20 Claims, 11 Drawing Sheets

Related U.S. Application Data continuation of application No. 17/473,400, filed on Sep. 13, 2021, now Pat. No. 11,591,852, which is a continuation of application No. 16/654,895, filed on Oct. 16, 2019, now Pat. No. 11,261,661.

(60) Provisional application No. 62/746,332, filed on Oct. 16, 2018.

(51) Int. Cl.
*E06B 9/78* (2006.01)
*F16H 1/28* (2006.01)

(56) References Cited

U.S. PATENT DOCUMENTS

| | | | |
|---|---|---|---|
| 3,013,760 | A | 12/1961 | Anderson |
| 3,730,469 | A | 5/1973 | Shields |
| 4,393,915 | A | 7/1983 | Olson |
| 4,475,580 | A | 10/1984 | Hennequin |
| 4,487,244 | A | 12/1984 | Olson |
| 4,565,078 | A | 1/1986 | Solomon |
| 4,779,662 | A | 10/1988 | Wilk |
| 4,921,033 | A | 5/1990 | Finch et al. |
| 4,932,456 | A | 6/1990 | Buxbaum |
| 5,232,038 | A | 8/1993 | Buxbaum |
| 6,164,428 | A | 12/2000 | Berman et al. |
| 6,196,508 | B1 | 3/2001 | Nijs |
| 6,685,592 | B2 | 2/2004 | Fraczek |
| 7,047,774 | B1 | 5/2006 | Gogel |
| 7,051,782 | B2 | 5/2006 | Nichols, Jr. |
| 7,195,052 | B2 | 3/2007 | Nien |
| 7,240,716 | B2 | 7/2007 | Nichols, Jr. |
| 7,625,151 | B2 | 12/2009 | Li et al. |
| 7,740,047 | B2 | 6/2010 | Koop et al. |
| 7,854,419 | B2 | 12/2010 | Ng et al. |
| 7,891,399 | B2 | 2/2011 | Rasmussen |
| 8,070,660 | B2 | 12/2011 | Seidel |
| 8,122,932 | B2 | 2/2012 | Cannaverde |
| 8,210,227 | B2 | 7/2012 | Hoffmann et al. |
| 8,267,234 | B2 | 9/2012 | Koop |
| 8,347,666 | B2 | 1/2013 | Stendal |
| 8,403,020 | B2 | 3/2013 | Rasmussen |
| 8,556,059 | B2 | 10/2013 | Ng |
| 8,579,004 | B2 | 11/2013 | Cannaverde |
| 8,695,681 | B2 | 4/2014 | Daniels |
| 8,875,348 | B2 | 11/2014 | Kossett |
| 8,967,568 | B2 | 3/2015 | Wills |
| 9,206,641 | B2 | 12/2015 | Feldstein et al. |
| 9,279,286 | B2 | 3/2016 | Higgins |
| 9,303,707 | B2 | 4/2016 | Fraczek |
| 9,322,214 | B2 | 4/2016 | Bohlen |
| 9,347,261 | B2 | 5/2016 | Blair et al. |
| 9,410,599 | B2 | 8/2016 | Yen et al. |
| 9,506,290 | B2 | 11/2016 | Lin |
| 9,810,019 | B2 | 11/2017 | Barnes |
| 9,850,704 | B2 | 12/2017 | Jang |
| 9,926,740 | B2 | 3/2018 | Pham |
| 9,976,346 | B2 | 5/2018 | Ng |
| 10,323,793 | B2 | 6/2019 | Daniels et al. |
| 10,472,887 | B2 | 11/2019 | Hebeisen et al. |
| 10,590,699 | B2 | 3/2020 | Chen |
| 10,612,301 | B2 | 4/2020 | Derk et al. |
| 10,743,699 | B2 | 8/2020 | Ng |
| 10,745,966 | B2 | 8/2020 | Chen et al. |
| 10,851,587 | B2 | 12/2020 | Anthony et al. |
| 10,895,106 | B2 | 1/2021 | Goldberg |
| 11,085,235 | B2 | 8/2021 | Mccreadie |
| 11,215,007 | B2 | 1/2022 | Schorling |
| 11,261,661 | B2 | 3/2022 | Miroshnichenko et al. |
| 11,332,974 | B2 | 5/2022 | Chiquin |
| 11,352,835 | B2 | 6/2022 | Tao |
| 11,591,852 | B2 * | 2/2023 | Miroshnichenko ....... E06B 9/42 |
| 11,598,148 | B2 | 3/2023 | Miroshnichenko et al. |
| 11,744,393 | B2 | 9/2023 | Mullet et al. |
| 11,840,887 | B2 * | 12/2023 | Miroshnichenko ....... E06B 9/78 |
| 2004/0129391 | A1 | 7/2004 | Gottschall et al. |
| 2005/0183835 | A1 | 8/2005 | Nien |
| 2008/0135191 | A1 | 6/2008 | Zakowski |
| 2008/0314533 | A1 | 12/2008 | Park |
| 2009/0108245 | A1 | 4/2009 | Daus |
| 2009/0152422 | A1 | 6/2009 | Ng et al. |
| 2009/0242145 | A1 | 10/2009 | Sheu |
| 2012/0043029 | A1 | 2/2012 | Gaskill et al. |
| 2012/0097346 | A1 | 4/2012 | Ng |
| 2013/0068904 | A1 | 3/2013 | Wills et al. |
| 2013/0098561 | A1 | 4/2013 | Mullet et al. |
| 2013/0199735 | A1 | 8/2013 | Colson et al. |
| 2014/0084122 | A1 | 3/2014 | Shevick |
| 2014/0158314 | A1 | 6/2014 | Anderson |
| 2014/0190642 | A1 | 7/2014 | Chou |
| 2015/0014501 | A1 | 1/2015 | Wills |
| 2015/0059992 | A1 | 3/2015 | Liu |
| 2015/0176330 | A1 | 6/2015 | Lin et al. |
| 2015/0322715 | A1 | 11/2015 | Chou |
| 2016/0130869 | A1 | 5/2016 | Cheng |
| 2016/0298388 | A1 | 10/2016 | Tao |
| 2017/0009519 | A1 | 1/2017 | Marocco |
| 2017/0058600 | A1 | 3/2017 | Mocanu |
| 2017/0218703 | A1 | 8/2017 | Wei |
| 2018/0112461 | A1 | 4/2018 | Holt |
| 2018/0320439 | A1 | 11/2018 | Mccreadie |
| 2020/0032583 | A1 | 1/2020 | Hebeisen et al. |
| 2020/0077829 | A1 | 3/2020 | Mullet et al. |
| 2020/0115958 | A1 | 4/2020 | Miroshnichenko et al. |
| 2020/0138226 | A1 | 5/2020 | Mullet et al. |

OTHER PUBLICATIONS

USPTO; Notice of Allowance dated Mar. 13, 2024 in U.S. Appl. No. 18/105,601.
USPTO; Notice of Allowance dated Mar. 18, 2024 in U.S. Appl. No. 17/577,841.
USPTO, Restriction/Election Requirement dated Jul. 30, 2021 in U.S. Appl. No. 16/654,895.
USPTO, Non-Final Office Action dated Oct. 1, 2021 in U.S. Appl. No. 16/654,895.
USPTO, Notice of Allowance dated Dec. 15, 2021 in U.S. Appl. No. 16/654,895.
USPTO, Non-Final Office Action dated Oct. 4, 2022 in U.S. Appl. No. 17/473,502.
USPTO, Non-Final Office Action dated Oct. 4, 2022 in U.S. Appl. No. 17/473,400.
USPTO, Notice of Allowance dated Dec. 21, 2022 in U.S. Appl. No. 17/473,400.
USPTO, Non-Final Office Action dated Oct. 5, 2022 in U.S. Appl. No. 17/473,599.
USPTO, Notice of Allowance dated Dec. 22, 2022 in U.S. Appl. No. 17/473,599.
USPTO, Non-Final Office Action dated Oct. 5, 2022 in U.S. Appl. No. 17/473,682.
USPTO, Non-Final Office Action dated Dec. 7, 2022 in U.S. Appl. No. 17/336,046.
USPTO, Final Office Action dated Jan. 17, 2023 in U.S. Appl. No. 17/473,682.
USPTO, Notice of Allowance dated Jan. 26, 2023 in U.S. Appl. No. 17/473,502.
USPTO, Non-Final Office Action dated Feb. 17, 2023 in U.S. Appl. No. 17/336,046.
USPTO, Notice of Allowance dated Feb. 23, 2023 in U.S. Appl. No. 17/473,682.
USPTO, Notice of Allowance dated Apr. 12, 2023 in U.S. Appl. No. 17/336,046.
USPTO, Non-Final Office Action dated Jul. 17, 2023 in U.S. Appl. No. 18/117,543.
USPTO, Non-Final Office Action dated Jul. 25, 2023 in U.S. Appl. No. 18/101,268.
USPTO, Notice of Allowance dated Aug. 8, 2023 in U.S. Appl. No. 18/101,268.

(56) References Cited

OTHER PUBLICATIONS

USPTO, Notice of Allowance dated Aug. 9, 2023 in U.S. Appl. No. 18/117,543.
USPTO, Non-Final Office Action dated Aug. 16, 2023 in U.S. Appl. No. 18/101,243.
USPTO, Notice of Allowance dated Aug. 23, 2023 in U.S. Appl. No. 18/101,243.
USPTO, Corrected Notice of Allowance dated Sep. 20, 2023 in U.S. Appl. No. 18/101,243.
USPTO, Non-Final Office Action dated Sep. 25, 2023 in U.S. Appl. No. 18/105,601.

* cited by examiner

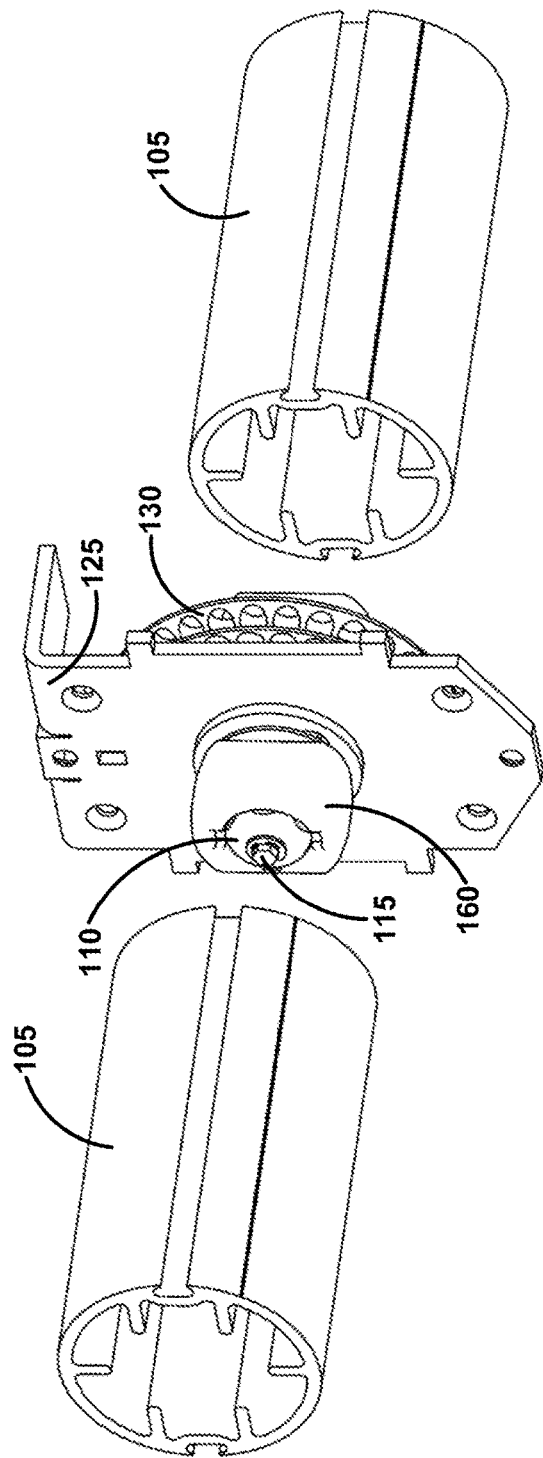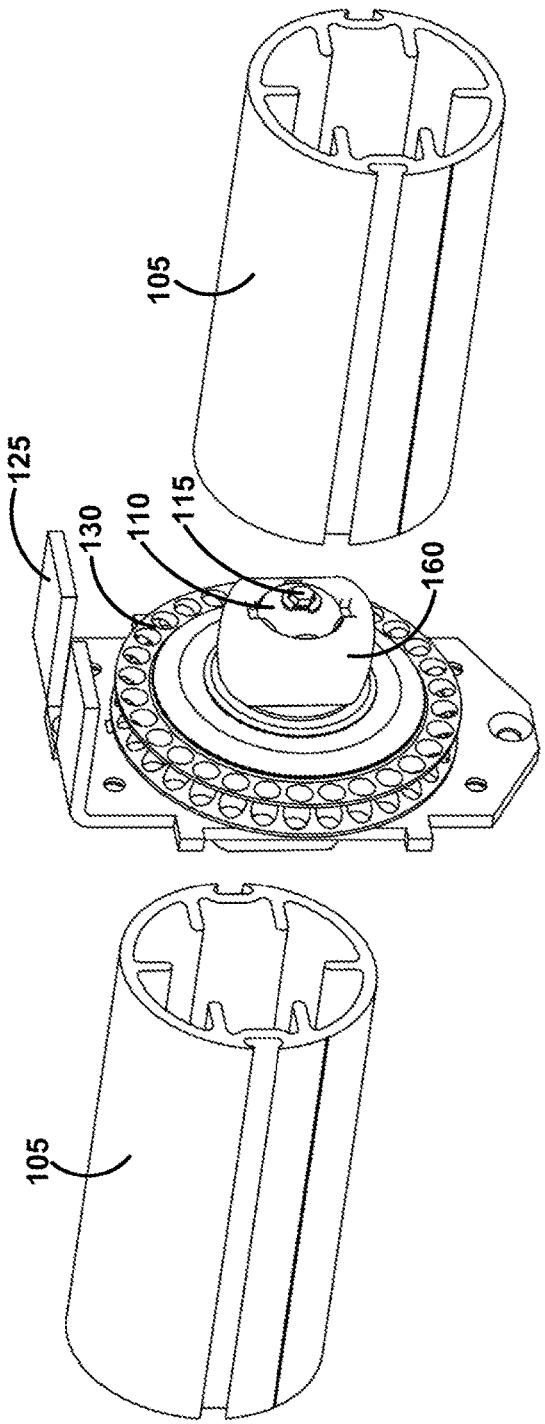

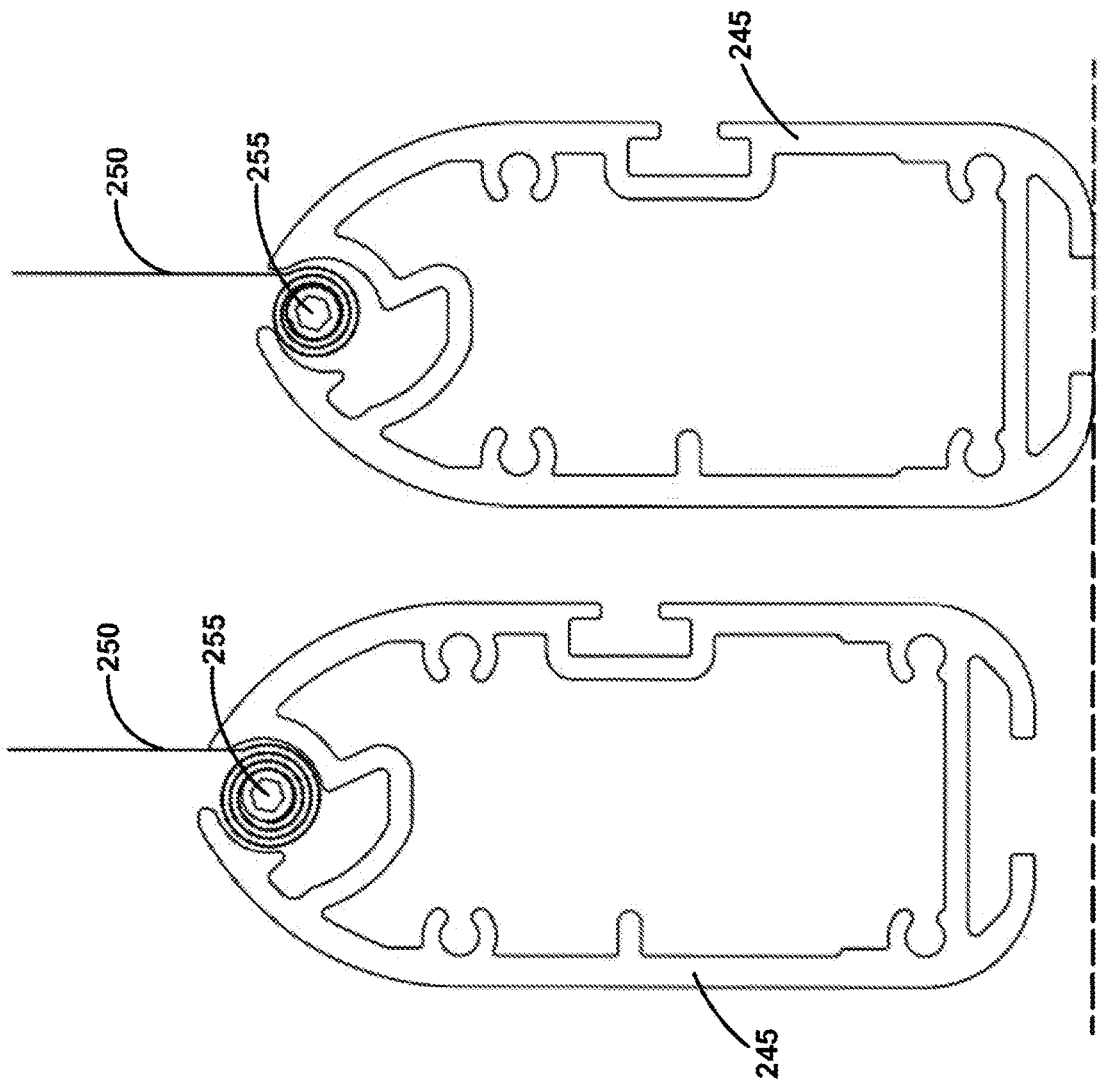

SUPPORT CONNECTOR CONTROL

CROSS-REFERENCE TO RELATED APPLICATIONS

This application is a continuation of, claims priority to and the benefit of, U.S. Ser. No. 18/101,243 filed Jan. 25, 2023 and entitled "SUPPORT CONNECTOR LOCK." The '243 application is a continuation of, claims priority to and the benefit of, U.S. Ser. No. 17/473,400 filed Sep. 13, 2021, now U.S. Pat. No. 11,591,852 issued Feb. 28, 2023 and entitled "SUPPORT CONNECTOR LOCK." The '400 application is a continuation of, claims priority to and the benefit of, U.S. Ser. No. 16/654,895 filed Oct. 16, 2019, now U.S. Pat. No. 11,261,661 issued Mar. 1, 2022 and entitled "ROLLER SHADE SYSTEM." The '895 application claims the benefit of, and priority to, U.S. Provisional Application Ser. No. 62/746,332 filed on Oct. 16, 2018 and entitled "ROLLER SHADE SYSTEM." All of the foregoing applications are hereby incorporated in their entirety by reference for all purposes.

TECHNICAL FIELD

This disclosure generally relates to improvements to various functions and features of roller shade systems.

BACKGROUND

With reference to FIG. 1, roller shade systems 100 typically include a window covering attached to a shade tube 105, wherein the window covering rolls up onto a shade tube 105. The shade tube 105 is mounted between brackets 125 and at least one of the brackets 125 is connected to a series of mechanical components such as gears, bearings, clutches, shafts, sprockets 130 and hubs. A bead chain is mounted onto the sprocket 130. Pulling on the bead chain rotates the sprocket 130, which opens up the clutch (e.g., spring). Opening the clutch allows rotation of a driving hub attached to the tube. The driving hub rotation rotates the tube which lowers (or raises) the shade. The clutch may include a wrap spring such as the wrap spring disclosed in U.S. Pat. No. 6,164,428 for "Wrap Spring Shade Operator", which is hereby incorporated by reference in its entirety for all purposes.

SUMMARY

Systems and methods are disclosed for an improved roller shade system that provides increased support, additional adjustments and/or increased safety. In various embodiments, the system may include a window shade system may comprise a slip plate engaged with a drive mechanism, wherein the drive mechanism rotates forward in response to the slip plate disengaging from the drive mechanism. The slip plate may re-engage with the drive mechanism after a predetermined rotation of the drive mechanism. The slip plate may include one or more protrusions (e.g., knuckles) that engage with one or more slots in the drive mechanism. The slip plate may include one or more protrusions that disengage from one or more slots in the drive mechanism, and wherein the drive mechanism rotates forward in response to the one or more protrusions disengaging from the one or more slots in the drive mechanism. The drive mechanism may comprise a brake hub.

In various embodiments, a window shade system may comprise a drive hub having a tube adapter comprised of dampening material, wherein the drive hub engages with at least one of a shade tube or a brake hub. The tube adapter includes one or more tabs that engage the brake hub. A sprocket may have a back wall that engages with an element that is concentric with a sun gear. The concentric element may be a flange comprising a non-tooth portion of the sun gear.

In various embodiments, a window shade system may comprise a shade band and a lock, wherein the lock is configured to restrict the shade band from unrolling. The unrolling may be in response to a clutch system being removed in a multi-banded shade system. The lock may be a slide lock that includes a first opening that allows rotation of the shade band and a second opening that restricts rotation of the shade band.

In various embodiments, a window shade system may comprise a multi-banded shade system having a support connector between each shade band, wherein the support connector is configured to retract to allow removal of the shade band. The support connector may comprise a first portion and a second portion, wherein the first portion retracts into the second portion. The support connector may be between a first shade tube and a second shade tube, wherein the support connector retracts by sliding into the first shade tube and out of the second tube.

In various embodiments, a window shade system may comprise a bracket having a first side and a second side; a drive shaft having a first portion that extends from the first side of the bracket and a second portion that extends from the second side of the bracket; a sprocket received by the drive shaft; a chain around the sprocket; a first shade tube engaged with the first portion of the drive shaft; and a second shade tube engaged with the second portion of the drive shaft.

In various embodiments, a window shade system may comprise a support connector; an adjustment arm having a first end, a middle portion and a second end, wherein the middle portion of the adjustment arm engages the support connector; and an adjustment screw engaging a first end of the adjustment arm, wherein in response to turning the adjustment screw, the adjustment arm rotates and adjusts the support connector. The adjustment screw may comprise a head with flat cuts, wherein upon rotation of the adjustment screw, the flat cuts provide tactile and audible feedback. The adjustment screw may comprise a head with flat cuts, wherein the flat cuts prevent back-rotation of the adjustment screw.

In various embodiments, a window shade system may comprise shade fabric with a first end and a second end; a rod that includes the second end of the shade fabric rolled around the rod; and a hembar engaging the rod within the hembar, wherein turning the rod adjusts a position of the hembar relative to the fabric.

BRIEF DESCRIPTION OF THE DRAWINGS

The accompanying drawings, wherein like numerals depict like elements, illustrate exemplary embodiments of the present disclosure, and together with the description, serve to explain the principles of the disclosure. In the drawings:

FIGS. 5A-5B illustrate exemplary tube adapters, in accordance with various embodiments;

FIGS. 9A-9B illustrate an exemplary hembar variably attached to the fabric, in accordance with various embodiments.

DETAILED DESCRIPTION

Figure 1:
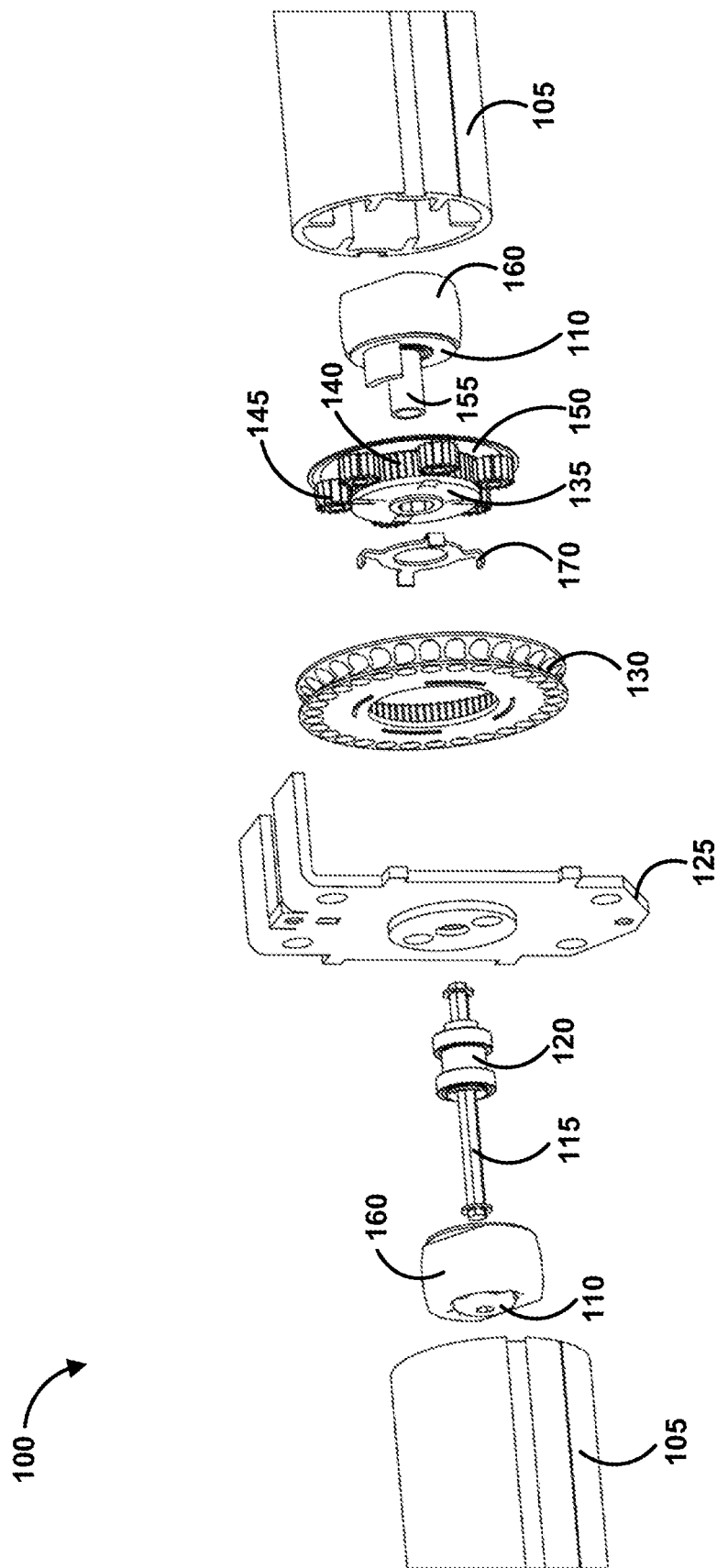
FIG. 1 illustrates an exploded view of a shade system, in accordance with various embodiments.
Figure 2B:
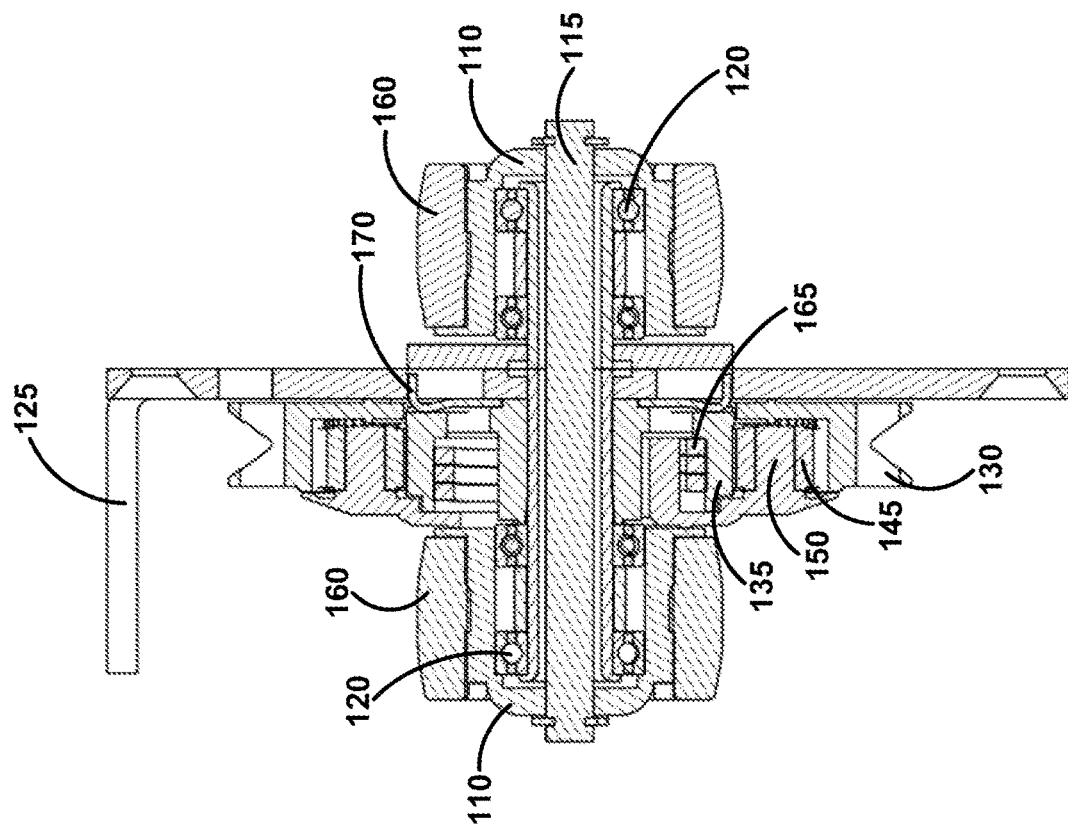
FIGS. 2A-2B illustrate an assembled shade bracket with various components, in accordance with various embodiments.
Figure 2A:
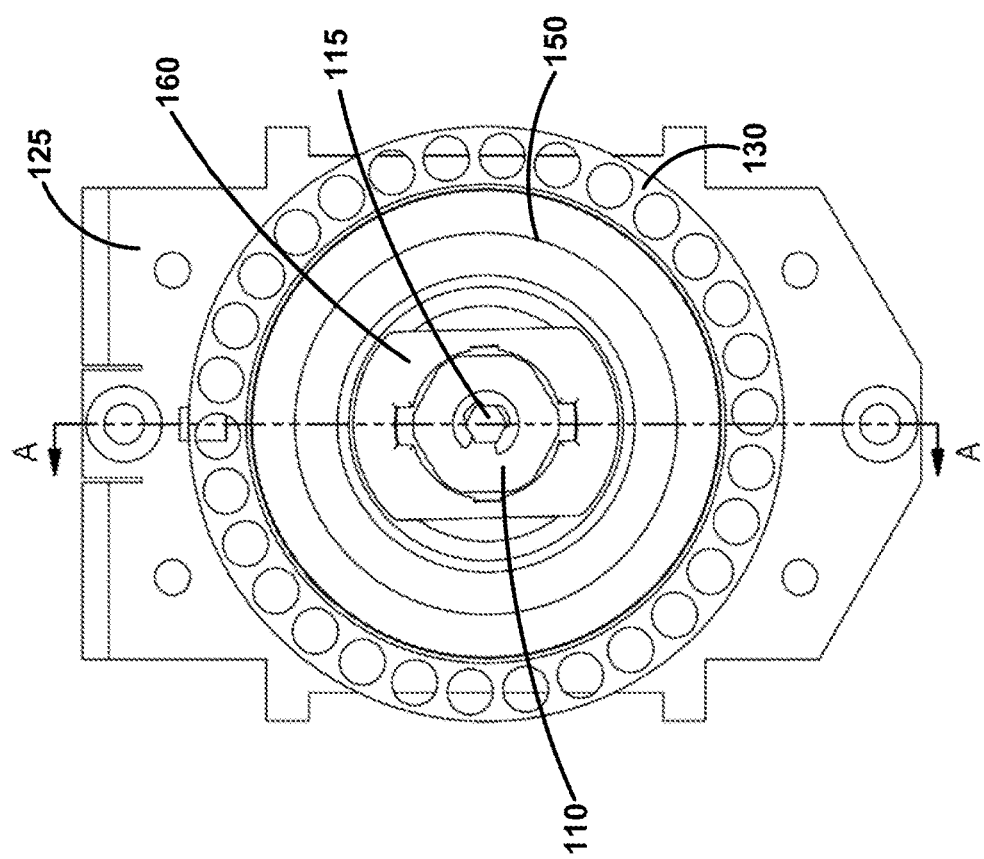

In various embodiments, and as set forth in FIG. 1, a shade system 100 may include a first shade tube 105, a drive hub 110, a drive shaft 115, support bearing 120, shade bracket 125, sprocket 130, a bead chain (not shown) that rotates around the sprocket 130, a brake hub 135 (that includes a sun gear 140), planetary gears 145 surrounding the sun gear 140, a planetary carrier 150 for the planetary gears 145, a wrap spring 165 in the brake hub 135 (shown in FIG. 2B), a bearing shaft 155, a drive hub 110 and a second shade tube 105. In various embodiments, the system may include one or more improvements such as a slip plate 170, center drive mechanism, tube adapter 160, back wall 200 on the sprocket 130, adjustment arm 215, shade band removal system and/or hembar 245 adjustment device, all of which are further described in detail below.

Figure 6:
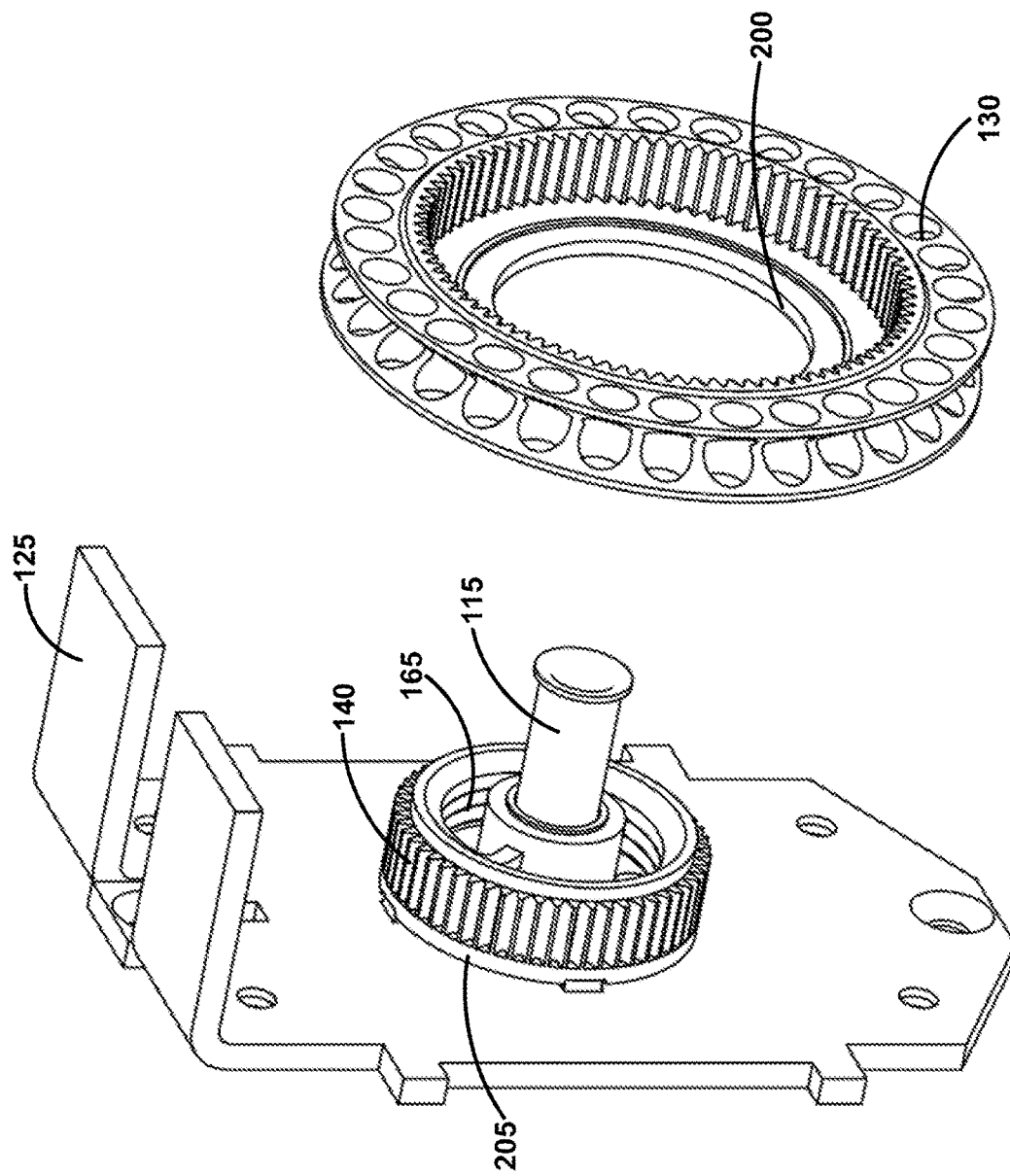
FIG. 6 illustrates an exemplary back wall on the sprocket that allows the sprocket 130 to rest on a surface to minimize impact on the gears, in accordance with various embodiments.

In proper operation, as initially set forth in FIG. 1, and in response to pulling the chain, the clutch (e.g., wrap spring) retracts away from the inside of the brake hub 135 to allow the brake hub 135 to rotate (and thus sprocket 130 to rotate) such that the chain around the sprocket 130 can be pulled down. Conversely, in response to the pulling force being released, the spring re-engages with the inside of the brake hub 135 and the wrap spring stops the rotation of the shade. In prior systems, the brake hub 135/sun gear 140 is permanently affixed to the bracket 125 and the planets rotate around the sun gear 140. Therefore, when users pull on the shade or hembar 245 (FIG. 9A) of the shade (i.e., back-driving the clutch) with too much force, the clutch components (e.g., wrap spring 165 (FIG. 6), brake hub 135, gears, etc) may be damaged or break.

Figure 3B:
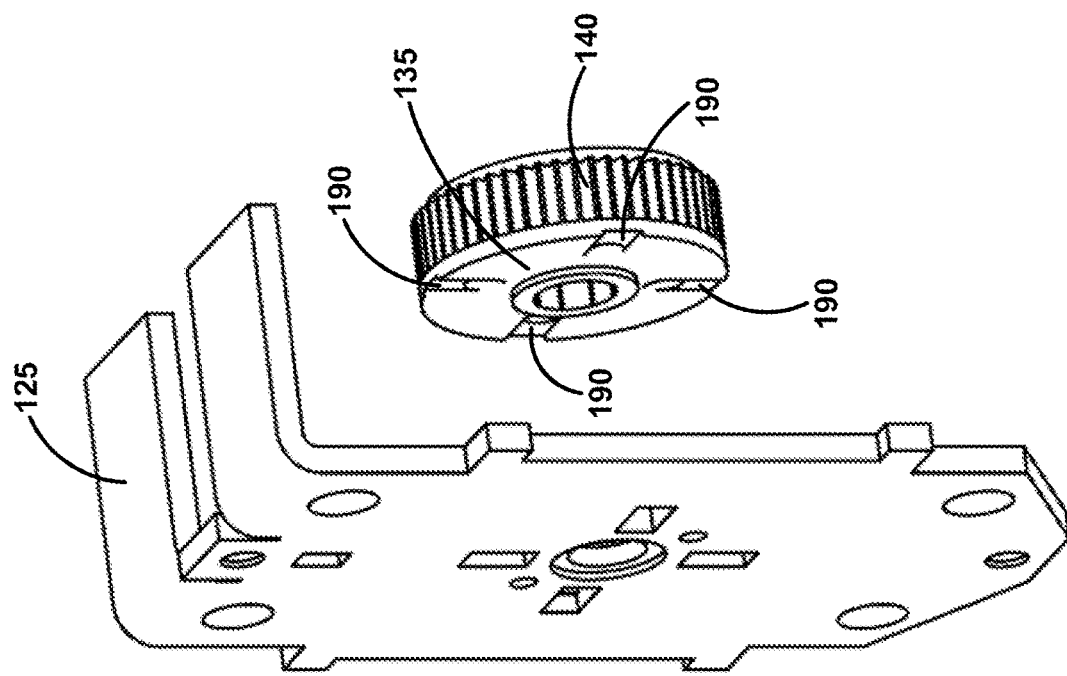
FIGS. 3A-3B illustrate an exemplary slip plate, in accordance with various embodiments.
Figure 3A:
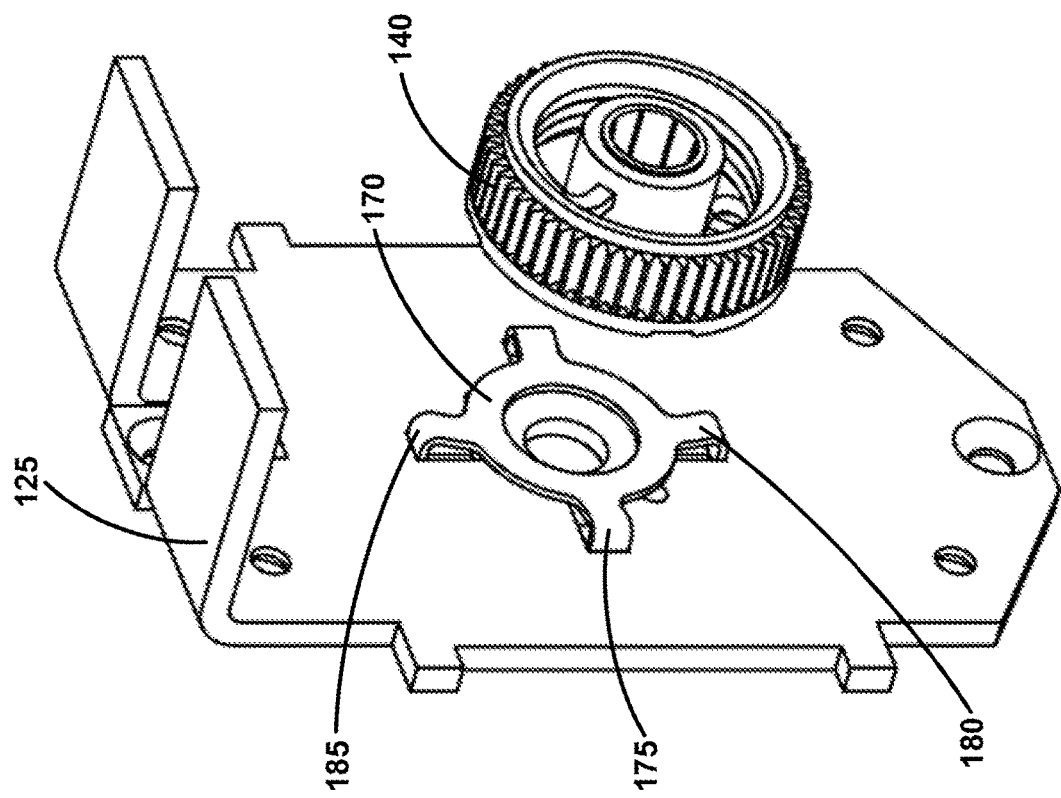

To help solve this problem, the system may include a slip plate 170 to avoid or minimize damage. In particular, with respect to FIGS. 3A and 3B, in various embodiments, the system may include a slip plate 170 (also known as a detent clutch or slipper clutch) engaged with the brake hub 135 (e.g., but not permanently affixed to the brake hub 135). In particular, the slip plate 170 includes any number or size of tangs 175 that engage with the brake hub 135, wherein the tangs 175 are received within any number of slots in the brake hub 135. The slip plate 170 allows the brake hub 135 to ratchet or slip forward any number of degrees (e.g., 90 degrees to the next slot, as shown in FIG. 3B) to reduce or avoid breaking the clutch components. The tangs 175 of the slip plate 170 may include any number of "protrusions" 180 and "fingers" 185. For example, the slip plate 170 may include four "protrusions" 180 that extend outward from the shade bracket 125 and into four "pockets" (or slots 190) in the brake hub 135. The 4 respective "fingers" 185 are received into the shade bracket 125 to hold the slip plate 170 against the shade bracket 125. When the user pulls the shade or hembar 245 with excessive force, the protrusions 180 pop out (or flex out) of their pockets 190 in the brake hub 135, thus allowing the brake hub 135 to "slip" forward and rotate (e.g., 90 degrees), until the knuckle 180 is caught again in the next pocket 190. The user may feel a ratcheting action as the protrusions 180 rotate through the "pockets" 190 while the force is applied. When the brake hub 135 slips forward, any portion or all of the drive mechanism (e.g., the sun gear 140 (that is part of the brake hub 135), planetary carrier 150, the bearing shaft 155, the drive hub 110, the tube adapter 160 and the shade tube 105) also slip forward to minimize or avoid breakage. However, the ratcheting action may not affect the relationship between the bead stop locations and the resulting hembar 245 position.

When a user pulls a shade too quickly and it reaches an end limit, a bead stop on the chain hits the bracket 125 housing and stops suddenly, which occasionally leads to the chain snapping. In particular, the chain sometimes breaks because the clutch does not close immediately, so the momentum of the shade tube 105 and fabric back-drives from the shade tube 105 through the tube adapter 160, through the drive hub 110, through the brake (which has not closed yet), into the sprocket 130, and causes excessive forces on the chain. Such back-drive may occur in the milliseconds before the clutch can close the brake and stop the system. The back-drive is what causes the sprocket 130 to continue pulling on the chain after the chain stops on the bead stop, thereby breaking the chain. In other words, the shade tube 105 may still spin due to momentum and because the clutch may stay open for a fraction of a second, even after the bead on the chain hits the stop point. The spinning of the shade tube 105 may exert torque on various components of the system and the chain may break. Other systems may include a bumper on the bead stop to act as a shock absorber, but such a bumper placement is often insufficient to prevent damage, the bumper placement is unsightly and/or the bumper placement gets in the way of various forms of chain guides.

As such, with respect to FIGS. 5A and 5B, in various embodiments, tube adapters 160 dampen the torque and absorb some of the force from the spinning tube. In particular, the flexible and soft tube adapter 160 dampens some of the force back-driving from the shade tube to the drive hub 110 and subsequently through the rest of the drive train. The tube adapters 160 help to protect the components and mitigate chain breakage. The tube adapters 160 minimize or prevent damage to the clutch, sprocket 130, chain, bead-stop, and/or housing of a drive bracket 125 due to excessive rotational speed of a shade being raised or lowered. The tube adapters 160 may be any dampening material such as, for example, urethane. The tube adapter 160 may be any shape or size. In various embodiments, the tube adapter 160 is sized and shaped to engage with different tube sizes and shapes. In various embodiments, the tube adapter 160 may be incorporated inside the clutch mechanism to further dampen and prevent chain breakage. For example, the drive hub 110 on the tube adapter 160 is typically rigid. However, the tube adapter 160 may include a semi-rigid element that has a limited amount of flexibility in the one or more tabs (on the drive hub 110) that drive the hub. This semi-rigid element of the drive hub 110 may have a certain amount of shock absorption built into the element. This semi-rigid element resides inside the brake hub 135, which may not be in the tube.

As shown in FIG. 1, in various embodiments, the sun gear 140 is a stationary component that allows the planetary gears 145 (that are held by the planetary carrier 150) to rotate around the sun gear 140 clutch. The planetary gears 145 rotate within the sprocket 130 (ring gear), so the load on the chain pulling on the sprocket 130 is typically pushing down on and putting weight on the planetary gears 145. This arrangement causes the sprocket 130 and planetary gears 145 to be off-center and wobble. As such, with respect to FIG. 6, in various embodiments, the system includes a "back wall 200" support on the sprocket 130 that provides support for the sprocket 130. In various embodiments, the back wall 200 may engage any element that is concentric to the sun gear 140, thereby supporting the load from pulling the chain. For example, the back wall 200 includes an opening of a smaller radius, so the back wall 200 sits on a flange (e.g., non-toothed portion) on the backside of the sun gear 140. As such, when the chain pulls down on the sprocket 130, at least a portion of the inner circumference of the opening in the back wall 200 of the sprocket 130 pushes against the flange 205 on the backside of the sun gear 140, and does not put pressure on the planetary gears 145. This arrangement keeps the brake hub 135/sun gear 140 centered and prevents wobble that leads to smoother operation. Having the brake hub 135 integrated with the sun gear 140 also makes for a smaller package and reduced quantities of system components.

When multiple shades (e.g., 2-6 shade bands) are installed next to each other across a large window, each shade would typically need its own drive bracket 125 (with its own sprocket 130, chain, etc) that controls the movement of the single shade. A shading system may also include a multi-banded system in which a multitude of individual shade-bands are driven by a single manual drive chain or motor that interfaces with a first shade. A shade band may consist of a shade tube 105, tube adapters 160, and a fabric band. The fabric band may comprise a spline (which may be welded to the top of the fabric) and the hembar 245 (which may be attached to the bottom of the fabric). In various embodiments, the system drives multiple shade bands through a single chain by using a support connector 210 (e.g., multi-band coupler between two shade bands). The support connector 210 fits within an accompanying bracket 125 between each shadeband. A single drive bracket 125 may be configured at one end of the group of shadebands being controlled. Pulling on the chain drives a first shade-band attached to the drive bracket 125, which is coupled to two or more shadebands, wherein each band is driven via a support connector 210 in a serial fashion from the first shadeband.

Figure 8B:
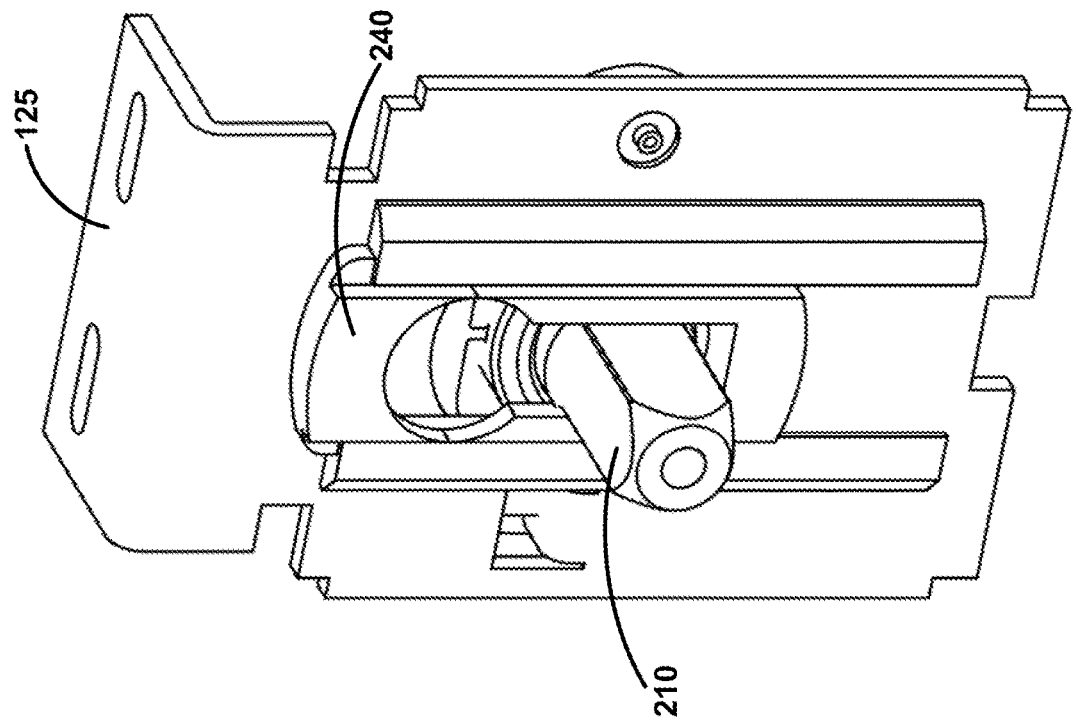
FIGS. 8A-8B illustrate an exemplary slide lock for a support connector, in accordance with various embodiments.
Figure 8A:
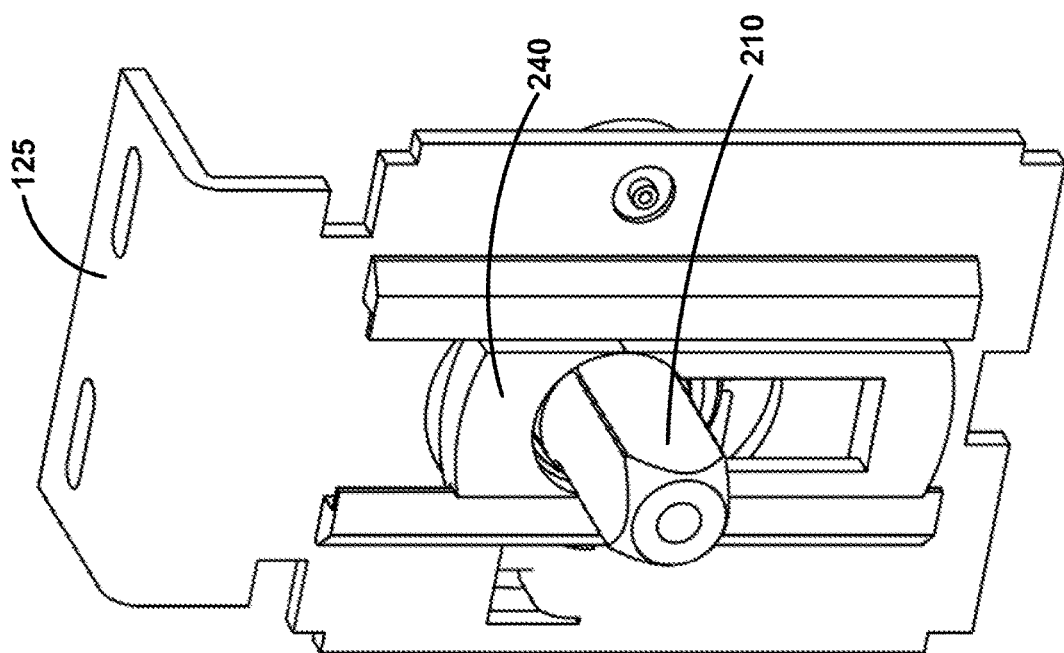

At times, one shade in the multi-banded system may need to be removed due to service or maintenance. However, if the shade band attached to the drive bracket (the bracket with the sprocket and clutch/brake mechanism) is removed, then all the shades may unroll because the clutch system at the drive bracket 125 is no longer restricting the shade tube 105 rotation. Moreover, if a second shade in a multi-banded system is removed, then the third shade, fourth shade, etc. may also unroll because, while the clutch system may still restrict the first shade, the clutch system is no longer restricting the shade tube 105 rotation in the subsequent shades. To prevent the shades from unrolling, some service people would tape the hembar 245 onto the rest of the window shade roll. However, the use of tape is often unreliable and requires additional time and effort to tape each individual shade. In various embodiments, the present system may allow an individual shade band in a multi-banded system to be removed without disturbing the rest of the bands in the system. Prior to a shade band being removed, any subsequent bands would be locked into place. The system may include a lock to prevent the shade tube 105 from unrolling when other shades in a multi-banded system are removed. The lock may be any device that restricts the rotation of the shade band and/or support connector 210. For example, a slide lock 240, a fork, pin or pawl that interfaces with the shade tube 105 and/or support connector 210. A slide lock 240 is shown in FIGS. 8A and 8B, wherein the support connector 210 extends through the slide lock 240 that includes a larger opening (that allows rotation in FIG. 8A) and a restricted opening (that restricts rotation in FIG. 8B). When the slide lock 240 is in the down position, the support connector 210 extends through the larger opening such that the support connector 210 is able to rotate. When the slide lock 240 is in the up position, the support connector 210 extends through the restricted opening such that the support connector 210 is restricted from rotation.

Moreover, the center-support brackets 125 in a multi-banded system typically include a support connector 210 that goes through the center-support bracket 125, such that a first shade tube 105 interfaces with the support connector 210 on the first side of the bracket 125 and a second shade tube 105 interfaces with the same support connector 210 on the second side of the bracket 125. This arrangement may repeat for subsequent shades in a multi-banded system. Because of this arrangement, when service personnel needs to remove, for example, a third shade band, they first need to remove the first shade band and the second shade band in order to be able to remove the third. In various embodiments, the present system provides a support connector 210 configured to be removed or moved out of the way, such that any shade band can be removed, without needing to remove the other shade bands. For example, the center-support connector 210 may be comprised of two shafts that interface with each other at the middle of the center-support bracket 125. These halves can individually be retracted into its respective shade tube 105, thereby allowing the shade band to be removed independently. In another example, the system may have the support connector 210 be a single shaft that can slide into either the first shade tube 105 or the second shade tube 105 in their respective shade bands on either side of the center-support bracket 125.

Figure 4:
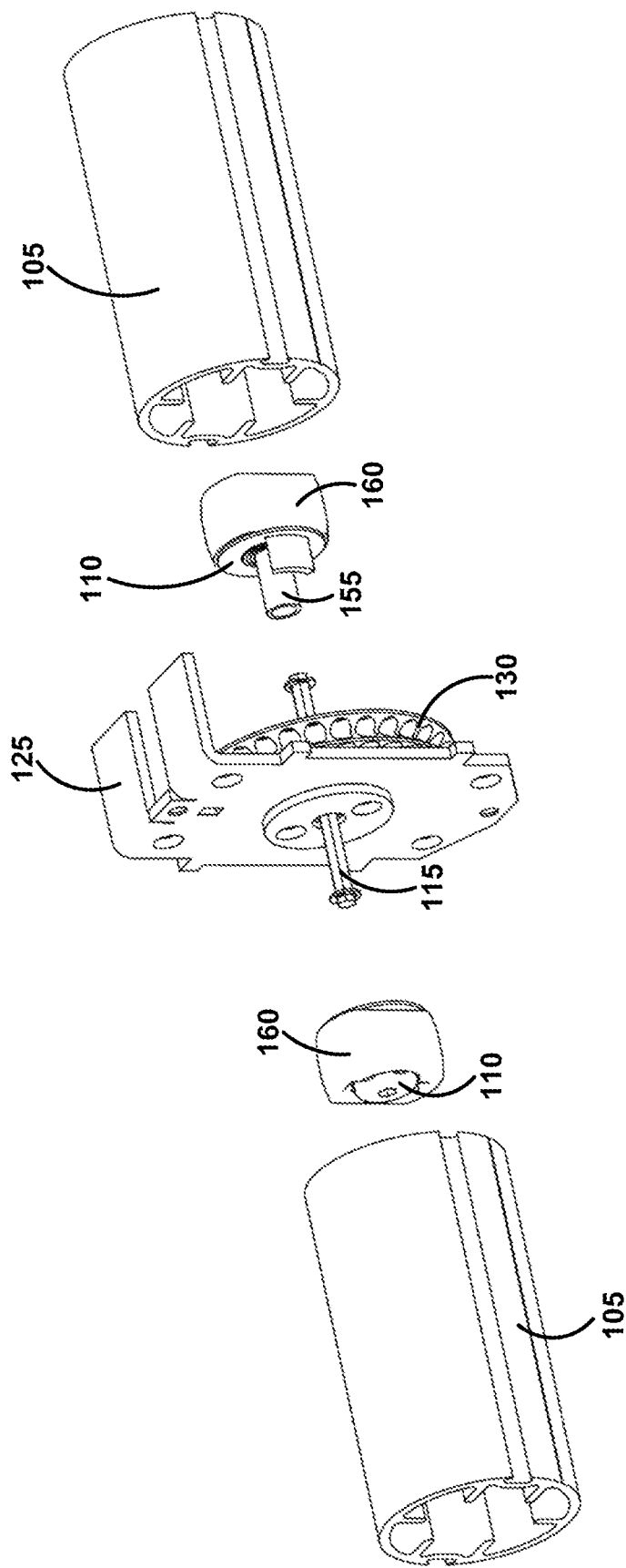
FIG. 4 illustrates an exemplary center drive mechanism, in accordance with various embodiments.

There are times when obstacles in the room (e.g., couches, tables, desks, etc.) could be obstructing access to the chain used to operate the group of shades in a multi-band arrangement. The chain may be hidden behind a column or recess preventing easy access to the chain in order to operate the shade. As such, with respect to FIG. 4, in various embodiments, the system may employ a center-drive mechanism such that the chain now is positioned at a location within the shade group where there is no obstacle obstructing access to it. The center drive mechanism may comprise a hole in the bracket 125 and the drive shaft 115 that goes through the bracket 125 (the drive shaft 115 can be any shape capable of transferring torque (e.g., hexagonal)). The drive shaft 115 controls the first drive hub 110 (on the left) that rotates the first shade and also controls the second drive hub 110 (on the right) that rotates the second shade. As such, when the one chain is pulled to rotate the sprocket 130/ring gear, the single drive transfers the rotational force to two shades on either side of the drive bracket 125. In other words, the center drive mechanism drives two bands of a shade in multi-band system via one central sprocket 130 where the two bands, on either side of the drive bracket 125, are driven in a parallel manner (as opposed to a serial manner). Either or both of the shade bands (on either side of the bracket 125) may themselves include a support connector 210 (as described above) on the end opposite of the drive bracket 125, so the center-drive mechanism may drive more than one shade on either or both sides of the bracket 125. In that regard, the center-drive mechanism may not necessarily be in the center of the various shade bands (e.g., may have 1 shade band on the left, and 2 coupled shade bands on the right).

In the past, installers would use a shim with the bracket 125 to try to align the brackets 125 when mounting the brackets 125, for example, on an uneven ceiling. The installers would place one or more shims of various thicknesses between the ceiling and the top mounting flange of the bracket to lower all brackets to the same level as the lowest bracket in a group. However, the installers would need to create and/or carry different shims. To try to minimize or avoid the use of shims, the installers may adjust a set screw that engages with a support connector 210 (e.g., at a center support in a multi-banded arrangement, as shown in FIGS. 7A-7D) and/or a set screw that engages with a shade band at an idle end (as shown in FIGS. 7E-7H). For example, a support connector 210 typically rests within a support connector 210 holder on the bracket 125. The support connector 210 holder is mounted with a fastener within a channel such that the support connector 210 holder may be configured to move up or down. A shade bracket 125 would include a screw below the support connector 210 holder and pushing against the support connector 210 holder, wherein turning the screw would raise or lower the support connector 210 holder. A similar set screw arrangement existed for a shade band at an idle end. In particular, shade systems would use a moveable element that supports the center-line of a shade. This moveable element rests on a screw via gravity alone. Adjusting this screw adjusts the centerline up and down. Such adjustments were used to even out the shade band to make the shade parallel to the window sill or to compensate for an uneven ceiling. However, such a screw assembly has disadvantages including that the assembly is underneath the unit, so the assembly increases the overall height of the bracket and takes up more space, especially inside a pocket.

Figure 7C:
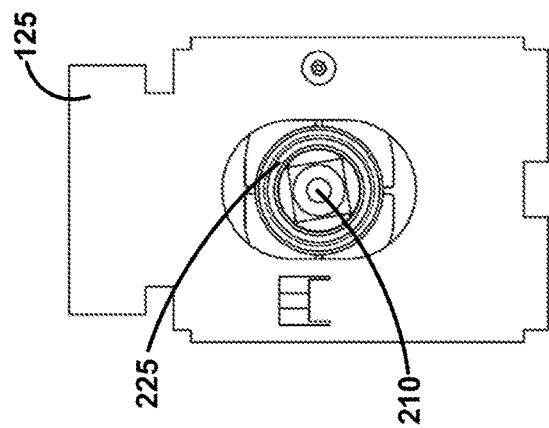
FIGS. 7A-7I illustrate various components of an exemplary adjustment arm, in accordance with various embodiments.
Figure 7D:
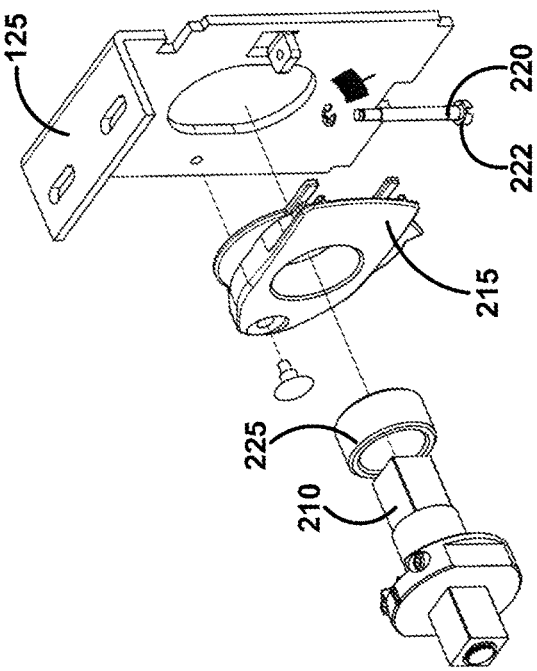
Figure 7B:
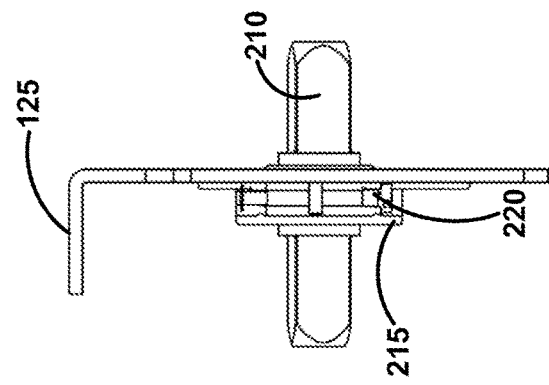
Figure 7A:
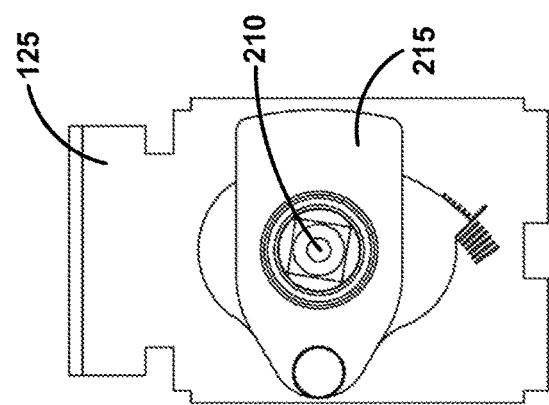
Figure 7H:
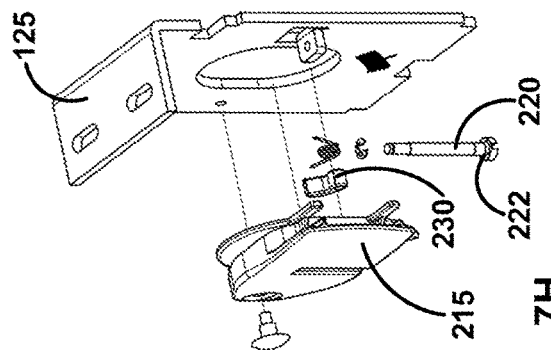
Figure 7G:
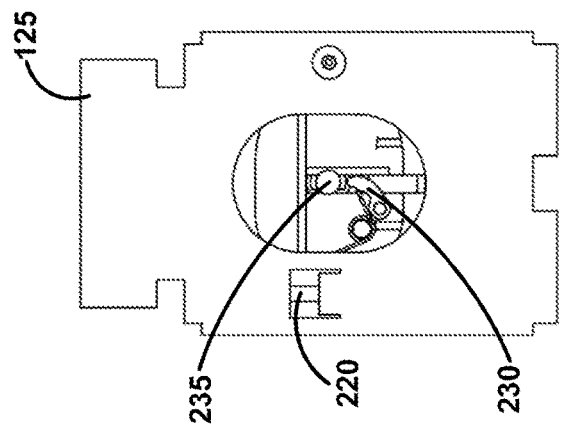
Figure 7F:
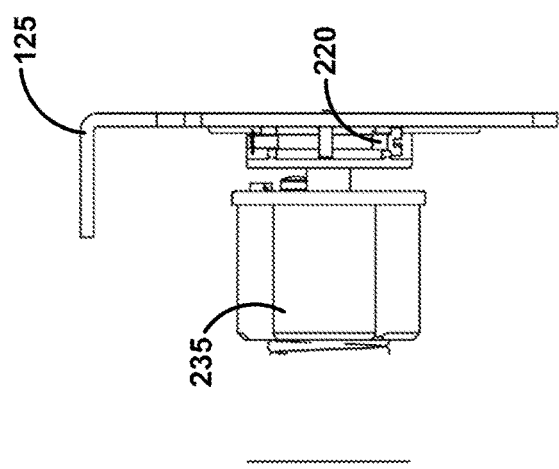
Figure 7E:
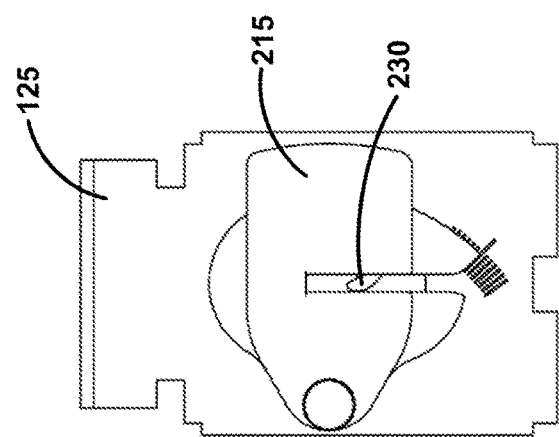
Figure 7I:
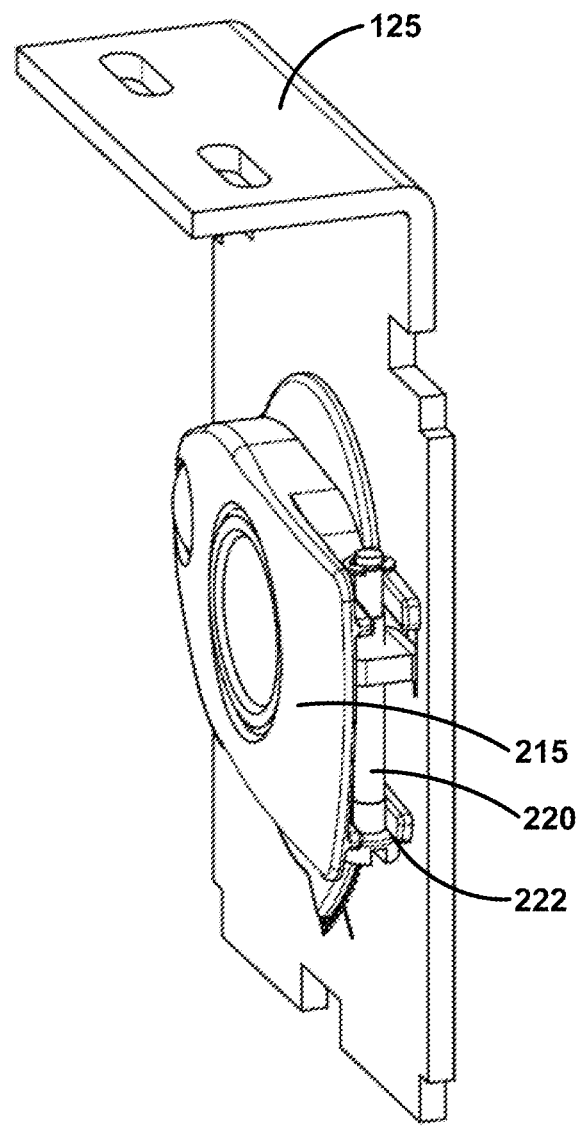

As such, with respect to FIG. 7A-7I, in various embodiments, the system includes a cam type pivot system (e.g., adjustment arm 215) to even out the shade band and adjust the centerline of a shade system. The adjustment arm 215 may include a first portion, a middle portion and a second portion. The middle portion of the adjustment arm engages the shaft, an adjustment screw engages a first portion of the adjustment arm and the second portion of the adjustment arm comprises the pivot point. As shown in FIGS. 7A-7D, center support bearing 225 is located around at least a portion of the support connector 210. When the center support bearing 225 is moved up or down, the shade band on each side of the bracket 125 also moves up or down. Similarly, as shown in FIGS. 7E-7H, when the shaft on the idle end band is moved up or down, the shade band including the lam spring 235 also moves up or down. The adjustment arm 215 allows for height adjustment by a swinging arc that may be self-locking and indexing. The system employs a centerline adjustment arm 215 that is used on the idle end to avoid the gears, and in order to ensure the centerline can be leveled for each band independently. The adjustment arm 215 allows for a curved path of travel for the center-line. The centerline translates horizontally as well as vertically. By having a cam like device, the pathway can be straight, vertically up and vertically down (without curving too much horizontally). Also, most screws (described above) have the adjustment mechanism resting below the support connector 210 or the idle end shaft. In the present device, as shown in FIG. 7I, the adjustment screw 220 is resting on the side (e.g., head) of the adjustment device. As shown in FIG. 7G, a spring-loaded locking pawl 230 retains the support connector 210 or lam spring 235 at a certain level. In response to turning the adjustment screw, the support connector 210 or idle end band is adjusted, while the spring-loaded locking pawl 230 continues to retain the support connector 210 or idle end band in the newly adjusted location.

In various embodiments, and as shown in FIG. 7I, the head of the adjustment screw 220 has one or more flat cuts 222 into at least a portion of the head. The housing of the adjustment device is resting on the head, as shown in FIG. 7I. The flat cut 222 allows the rotation of the adjustment screw 220 to provide feedback in the form of a tactile and/or audible click. The feedback allows the rotation of the adjustment screw 220 to be indexed (e.g., every 180 degrees). The indexing gives the user a reference point for how many turns they have made. The flat cut 222 also prevents the adjustment screw 220 from back-driving or loosening (e.g., helps lock the adjustment screw 220 so that it does not turn on its own). In various embodiments, the system may also employ an adjustable dogbone-type coupling device allowing the system to level each shade band independently, as set forth in U.S. Pat. No. 7,625,151, which is hereby incorporated by reference in its entirety for all purposes. Adjacent shade bands may not always be aligned vertically with each other, so the present system allows for adjustment of one or more hembars 245 to maintain visual consistency. In various embodiments, the system may also include mechanisms that allow the hembar 245 to be variably attached to the fabric. In various embodiments, as shown in FIGS. 9A and 9B, the bottom position of the hembar 245 is not fixed and can be shifted up (as in FIG. 9A) or down (as in FIG. 9B) to allow for adjustment of the hembar 245 vertically on the fabric 250. The fabric 250 at the bottom of the window shade may be rolled around a small tube 255 that can be rigidly fixed inside the hembar 245. Tube 255 may include a rod with a head that can be turned. For example, the head of the rod may include a hex head that can be turned with a hex key, a channel that can be turned with a flat head screw driver, or a cross-hair that can be turned with a screw driver having a head that is shaped like a fared cross with a rounded point. By rolling up a small amount of fabric 250, the position of the hembar 245 can be adjusted up or down vertically as it hangs from the bottom of the fabric 250.

The roller shade system may be controlled by a shade control system. As such, this application incorporates by reference for all purposes and in their entirety: U.S. Ser. No. 14/692,868 filed on Apr. 22, 2015 and entitled "Automated Shade Control System Interaction With Building Management System"; PCT Application No. PCT/US2013/066316 filed on Oct. 23, 2013 and entitled "Automated Shade Control System Utilizing Brightness Modeling"; PCT Application No. PCT/US2013/066316; U.S. Ser. No. 13/671,018 filed on Nov. 7, 2012, now U.S. Pat. No. 8,890,456 entitled "Automated Shade Control System Utilizing Brightness Modeling"; U.S. Ser. No. 13/556,388 filed on Jul. 24, 2012, now U.S. Pat. No. 8,432,117 entitled "Automated Shade Control System"; U.S. Ser. No. 13/343,912 filed on Jan. 5, 2012, now U.S. Pat. No. 8,248,014 entitled "Automated Shade Control System"; U.S. Ser. No. 12/475,312 filed on May 29, 2009, now U.S. Pat. No. 8,120,292 entitled "Automated Shade Control Reflectance Module"; U.S. Ser. No. 12/421,410 filed on Apr. 9, 2009, now U.S. Pat. No. 8,125,172 entitled "Automated Shade Control Method and System"; U.S. Ser. No. 12/197,863 filed on Aug. 25, 2008, now U.S. Pat. No. 7,977,904 entitled "Automated Shade Control Method and System"; U.S. Ser. No. 11/162,377 filed on Sep. 8, 2005, now U.S. Pat. No. 7,417,397 entitled "Automated Shade Control Method and System"; U.S. Ser. No. 10/906,817 filed on Mar. 8, 2005, and entitled "Automated Shade Control Method and System"; and U.S. Provisional No. 60/521,497 filed on May 6, 2004, and entitled "Automated Shade Control Method and System."

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A window shade system comprising:
a first shade band having a support connector; and
a lock that receives the support connector,
wherein the lock includes a first opening in a first position,
wherein the first opening is configured to receive the support connector,
wherein the first opening is configured to restrict rotation of the support connector,
wherein the lock includes a second opening in a second position,
wherein the second opening is configured to receive the support connector, and
wherein the second opening is configured to allow rotation of the support connector.

2. The system of claim 1, wherein the lock is configured to move to the first position such that the support connector is within the first opening.

3. The system of claim 1, wherein the lock is configured to move to the second position such that the support connector is within the second opening.

4. The system of claim 1, wherein the support connector and the first opening have different geometric shapes.

5. The system of claim 1, wherein a width of the second opening is wider than a width of the support connector.

6. The system of claim 1, wherein the support connector has a flat side.

7. The system of claim 1, wherein the support connector has a flat side, and wherein the first opening of the lock is in the form of a rectangle such that a first side of the rectangle interfaces with the flat side of the support connector to restrict rotation of the support connector.

8. The system of claim 1, wherein the second opening of the lock is in the form of a circle such that the support connector rotates within the circle to allow rotation of the support connector.

9. The system of claim 1, wherein the rotation of the support connector is in response to a clutch system being removed in a multi-banded shade system.

10. The system of claim 1, further comprising rails on each side of the lock, wherein the lock slides within the rails.

11. The system of claim 1, wherein the rotation of the support connector is in response to at least one of another support connector, a clutch system or a second shade band being removed in a multi-banded shade system.

12. The system of claim 1, further comprising:
an adjustment arm having a first portion, a middle portion and a second portion, wherein the middle portion of the adjustment arm engages the support connector; and
an adjustment screw engaging a first portion of the adjustment arm, wherein in response to turning the adjustment screw, the adjustment arm is configured to rotate and adjust the support connector.

13. The system of claim 1, further comprising
shade fabric coupled to the first shade band, wherein the shade fabric has a first portion and a second portion;
a rod that includes the second portion of the shade fabric rolled around the rod; and
a hembar engaging the rod within the hembar, wherein turning the rod adjusts a position of the hembar relative to the fabric.

14. The system of claim 1, wherein the first shade band is driven by a drive mechanism, and wherein the drive mechanism is engaged by a slip plate, wherein the drive mechanism rotates forward in response to the slip plate disengaging from the drive mechanism.

15. The system of claim 1, further comprising:
a bracket having a first side and a second side;
a drive shaft having a first portion that extends from the first side of the bracket and a second portion that extends from the second side of the bracket;
the drive mechanism received by the drive shaft;
a chain around a sprocket of the drive mechanism;
the first shade band engaged with the first portion of the drive shaft; and
a second shade band engaged with the second portion of the drive shaft.

16. The system of claim 15, wherein the first portion of the drive shaft controls a first drive hub that rotates the first shade band and the second portion of the drive shaft controls a second drive hub that rotates the second shade band.

17. The system of claim 15, wherein in response to the chain being pulled, rotational force is transferred to the first shade band on the first side of the bracket and to the second shade band on the second side of the bracket.

18. The system of claim 15, wherein the sprocket drives in parallel the first shade band and the second shade band.

19. The system of claim 1, wherein the support connector is configured to retract to allow removal of the first shade band.

20. The system of claim 1, further comprising:
an adjustment arm having a first portion, a middle portion and a second portion, wherein the middle portion of the adjustment arm engages the first shade band; and
an adjustment screw engaging a first portion of the adjustment arm, wherein in response to turning the adjustment screw, the adjustment arm is configured to rotate and adjust the first shade band.

* * * * *